United States Patent [19]

Marvin, Jr. et al.

[11] 3,858,752

[45] Jan. 7, 1975

[54] CONTAINER HAVING IMPROVED RESEALABLE CLOSURE SYSTEM

[75] Inventors: Richard T. Marvin, Jr., Newport Beach; Donald O. Rasmussen, Arcadia, both of Calif.

[73] Assignee: Plastics Research Corporation, Los Angeles, Calif.

[22] Filed: Feb. 4, 1974

[21] Appl. No.: 439,439

[52] U.S. Cl. .................220/325, 220/378, 220/4 E, 220/7, 220/74, 292/218, 285/DIG. 11, 220/81
[51] Int. Cl. ...... B65d 53/00, B65d 7/00, B65d 7/24
[58] Field of Search ......... 220/46 R, 5 A, 55 F, 4 E, 220/55 AN, 4 B, 7, 74 R, 73, 81; 292/213, 218; 285/DIG. 11

[56] References Cited
UNITED STATES PATENTS

| | | | |
|---|---|---|---|
| 2,330,306 | 9/1943 | Murphy | 220/55 |
| 2,590,803 | 3/1952 | Unger et al. | 220/46 MS |
| 2,837,063 | 6/1958 | Martinez | 121/194 |
| 2,939,603 | 6/1960 | Young | 220/4 |
| 3,042,248 | 7/1962 | Krueger | 220/46 |
| 3,072,285 | 1/1963 | Aileo | 220/44 |
| 3,113,690 | 12/1963 | Asenbauer | 220/4 |
| 3,464,579 | 9/1969 | Asenbauer | 220/4 |
| 3,581,814 | 6/1971 | Jackson | 220/73 |
| 3,666,340 | 5/1972 | Albeanese | 220/46 R |
| 3,688,941 | 9/1972 | Bildsten | 220/46 R |

FOREIGN PATENTS OR APPLICATIONS

| | | | |
|---|---|---|---|
| 16,748 | 3/1909 | Great Britain | 285/DIG. 11 |

OTHER PUBLICATIONS

U.S. Army Rocket and Missile Container Design Guide, pp. 11–12.
Fundamentals of Guided Missile Packaging, Shock and Shock Vibration Design Factors, Chapter 10, p. 19, 7–1955.

*Primary Examiner*—William I. Price
*Assistant Examiner*—Joseph Man- Fu Moy
*Attorney, Agent, or Firm*—Christie, Parker & Hale

[57] ABSTRACT

First and second flexible plastic body portions together define a container chamber and each comprise at least one side encircling the chamber. A resealable closure system is provided as follows. A seal flange is on at least one side of each body portion. The sealing flanges each encircle the chamber and are formed from the corresponding flexible plastic body portion. The sealing flanges have a side on each facing the other and a side on each oppositely facing the other. A stiffener is on at least one of the sealing flanges. The stiffener encircles the enclosure and is positioned on the oppositely facing side of the corresponding sealing flange. Releasable clamps are disposed around the chamber for forcing the sealing flanges toward each other. The clamp acts through the stiffener on the corresponding sealing flanges. The clamps each have a first condition forcing the sealing flanges together to a first spacing and a second condition allowing the sealing flanges to be separated. Structure is provided in between the facing sides of the sealing flanges such that when the first condition exists, the structure exerts substantially balancing reaction forces between the facing sides from the chamber to the exterior of the container. The structure comprises a resilient gasket encircling the chamber in between the facing sides of the sealing flanges. The gasket is structured for providing, between the facing sides of the sealing flanges and the gasket, a gas-tight seal. The closure system balances the forces applied by the clamps with reactions exerted by the gasket structure and substantially eliminates side forces.

16 Claims, 15 Drawing Figures

PATENTED JAN 7 1975 3,858,752
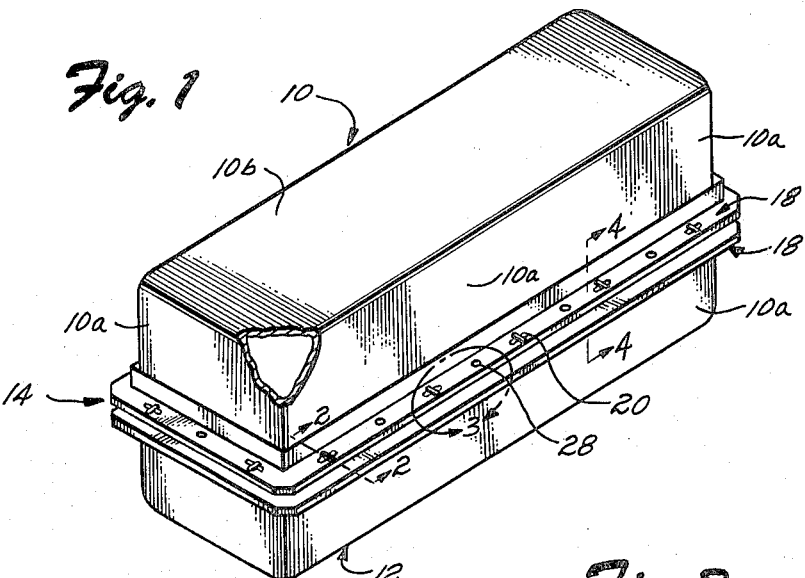
Fig. 1
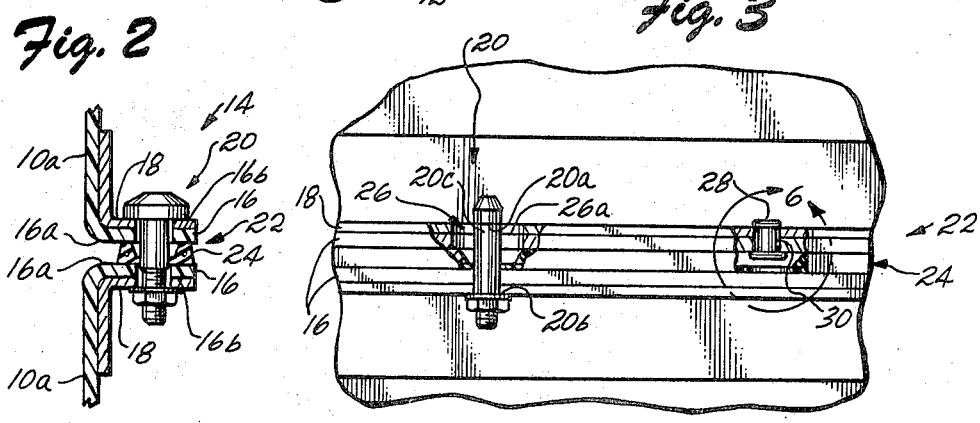
Fig. 2
Fig. 3
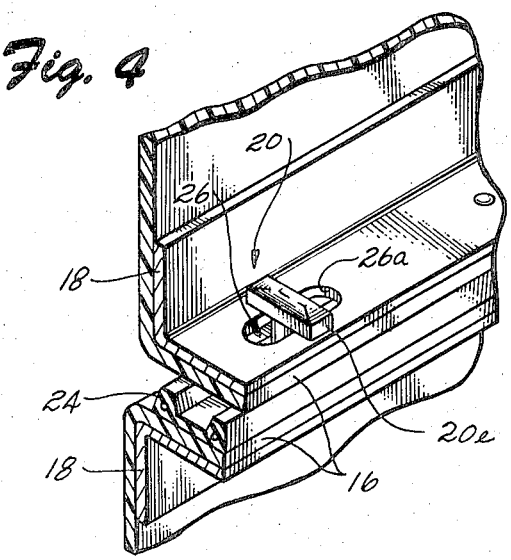
Fig. 4

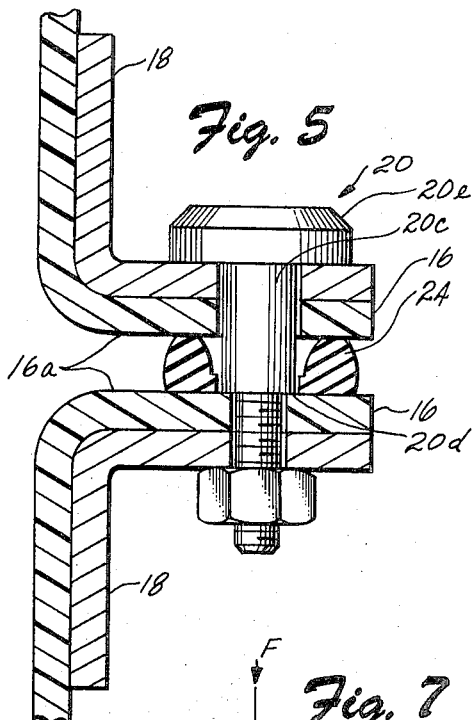
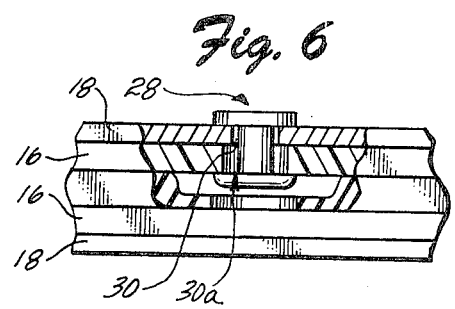
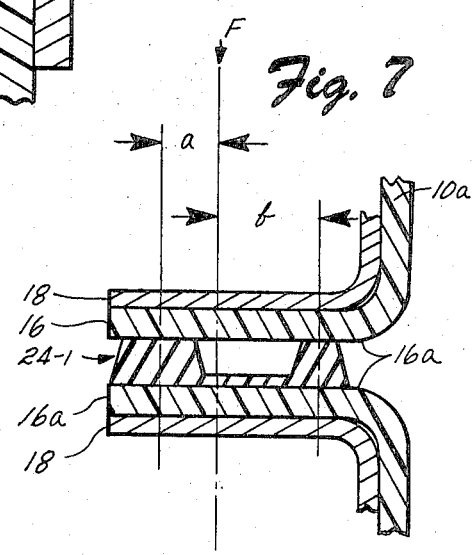
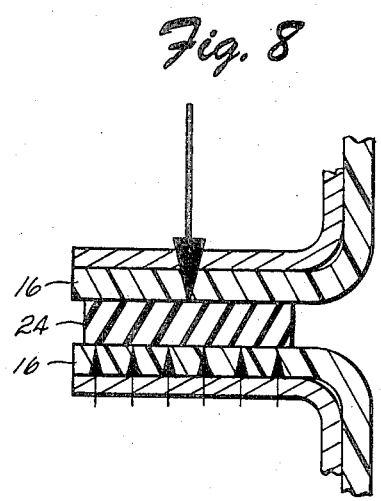
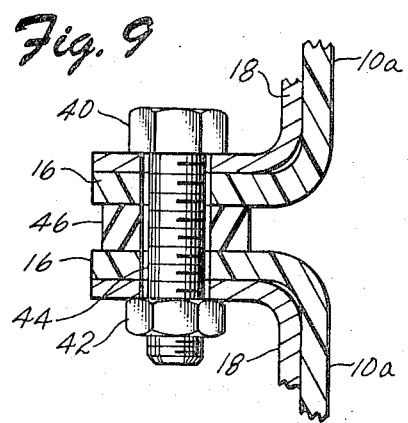
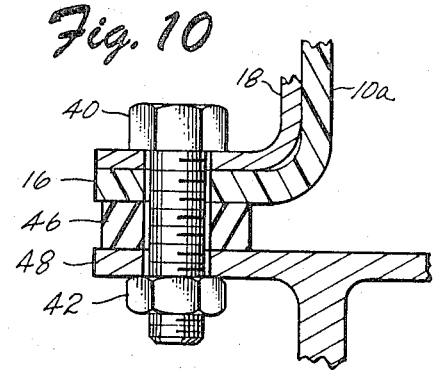

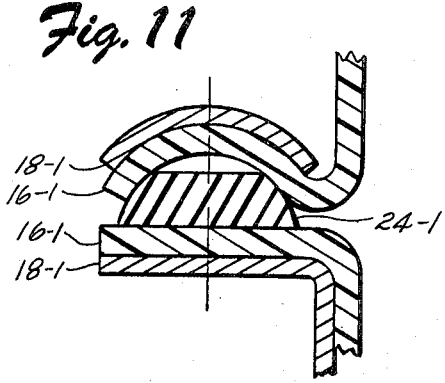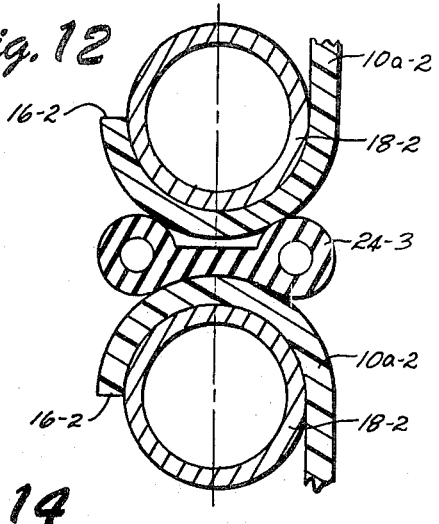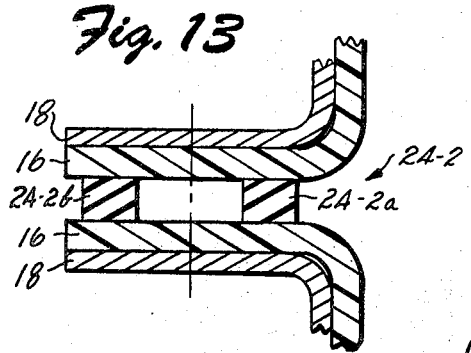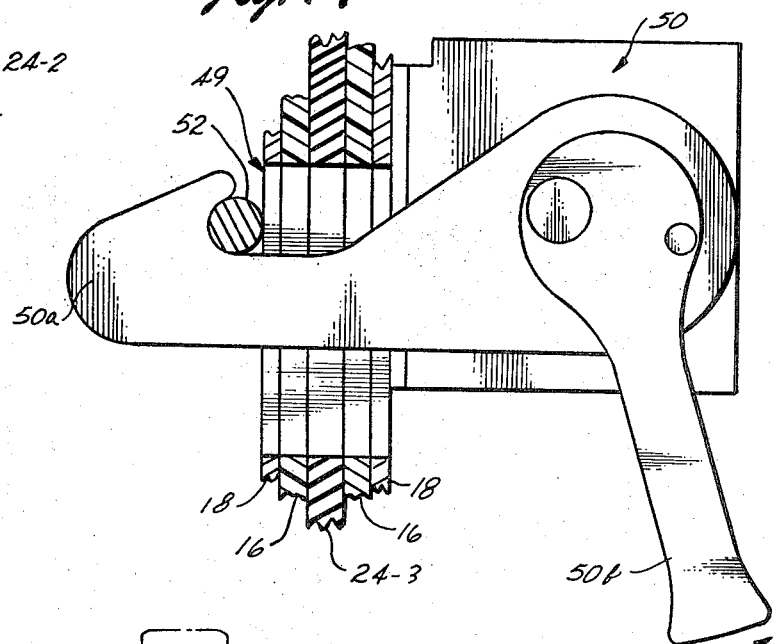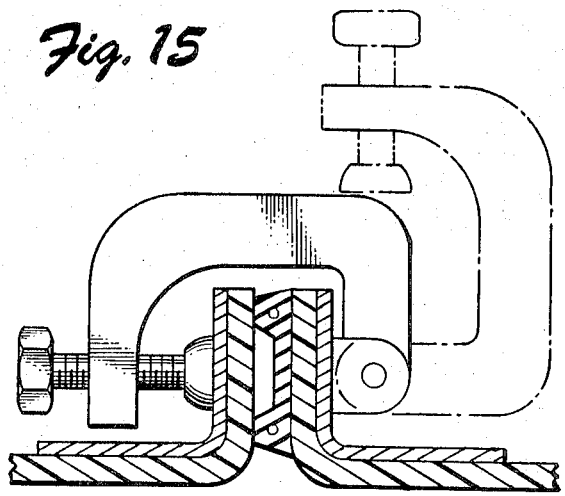

CONTAINER HAVING IMPROVED RESEALABLE CLOSURE SYSTEM

BACKGROUND OF THE INVENTION

This invention relates to containers, and more particularly, to plastic containers having an improved resealable closure system.

Many different types of closure systems exist for metal and plastic containers. Examples of the prior art closure systems for metal containers are shown in Chapter 11, pages 11-2 through 11-10 of the book *U.S. Army Rocket and Missile Container Design Guide*, published by the Research and Development Division, Watertown Arsenal, Watertown, Massachusetts. Other systems are disclosed in the book *Fundamentals of Guided Missile Packaging, Shock and Vibration Design Factors*, July 1955, published by the Office of Assistant Secretary of Defense prepared by the Naval Research Laboratory under No. RD 219/3. However, each of these designs has a number of drawbacks when applied to plastic containers. Also, special problems arise with respect to resealable closure systems which require an air-tight seal and internal pressurization.

One prior art closure arrangement is shown in FIG. 10.7 of the Guided Missile Packaging reference. Here an aluminum extrusion is welded to an aluminum cover forming one-half of the container. The lower portion of the container is attached to a steel base. A gasket is provided in between the aluminum extrusion and the steel base. A latch forces the aluminum extrusion toward the steel base, causing a seal between the gasket and steel base. However, it should be noted that the welded connection between the upper aluminum cover and the aluminum extrusion is a weakness in the pressurized container system, since special care must be taken to make sure that gas leaks do not occur therebetween. Additionally, the latch provides side forces on the aluminum extrusion in such a manner that uneven reaction forces are provided between the gasket and the aluminum extrusion and steel base. As a result, the aluminum extrusion tends to tip outwardly, applying side forces to the aluminum cover, thus making this type configuration not suitable for flexible plastic containers. FIGS. 10.9, 10.11, and 10.12 of the Guided Missile Packaging reference disclose a way of reducing the stringent requirements for the gas-tight weld between the upper aluminum container and the aluminum extrusion. In these figures, it is proposed to wrap the aluminum cover around an L-shaped stiffener and place the resilient gasket in between the base structure and the cover. As a result, only the cover wall itself needs to be sealed against the gasket, eliminating the need for special welds or seals between the cover and the stiffener. However, in this design, side forces are applied to the stiffeners. For example, in FIG. 10.9, a stop is provided towards the outside of the container from the gasket and a fastener in the form of a nut and bolt is formed for clamping the stiffener on the gasket side from the stop. As a result, the stiffener rotates about the stop and hence bends the cover wall. Similar problems exist in the other figures of the Guided Missile Packaging reference referred to above.

The problem is particularly acute in containers made out of plastic materials. The plastic is generally not stiff enough to withstand side loads and allows the sealing flanges to tip to a point where the pressure seal is broken. Also, repeated bending of the cover due to side loads can fracture the plastic material.

It is desirable to make container walls out of plastic because of the flexibility of design, low weight, ease of removal of the cover, low maintenance (i.e., elimination of rust and corrosion) and low cost of molded plastic fabrication. However, the above-mentioned disadvantages have detracted from the use of plastic containers. This is particularly true where extremely large containers are required. For example, one application requires a container of approximately 107" in length to function with temperature variations between $-60°$ F. and $+160°$ F. where an overall change in length of ½ inches can be expected in the plastic material due to expansion and contraction.

SUMMARY OF THE INVENTION

Briefly, an embodiment of the present invention is a plastic container having improved resealable closure system. First and second flexible plastic body portions together define a chamber and each have at least one side encircling the chamber. The resealable closure system includes a sealing flange on the at least one side of each body portion. The sealing flanges each encircle the chamber and are formed from the corresponding flexible plastic body portion. The sealing flanges comprise on each, a side facing the other and a side oppositely facing the other. A stiffener is provided for at least one of the sealing flanges. The stiffener encircles the chamber and is positioned on the oppositely facing side of the corresponding sealing flange. Releasable clamps are disposed around the chamber for forcing the sealing flanges toward each other. The clamp acts through the stiffener on the corresponding sealing flange. The clamps each have a first condition, forcing the sealing flanges together to a first spacing, and a second condition allowing the sealing flanges to be separated.

Structure is provided in between the facing sides of the sealing flanges such that when the first condition exists, the structure exerts substantially balancing reaction forces between the facing sides extending from the chamber to the exterior of the container. The structure comprises a resilient gasket encircling the chamber in between the facing sides of the sealing flanges. The gasket is structured for providing, between the facing sides of the sealing flanges and the gasket, a gas-tight seal. The closure system balances reaction forces and substantially eliminates side loading forces. Preferably, the stiffener is formed of metal, thereby avoiding galling primarily attendant where the clamp acts directly against plastic. Also, the metal stiffener helps protect the flanges when struck from the side. Preferably, the stiffener has an L-shaped cross-section, thereby providing further rigidity to the stiffener.

Preferably, the gasket is U-shaped in cross-section. It is found that such a gasket provides an adequate seal with relatively low closing forces and allows for irregularities in the spacing between the sealing flanges while still providing balanced reactions.

Preferably, the resealable closure system includes a stiffener on the oppositely facing side of both seal flanges.

Preferably, aligned openings are provided for each clamp through the stiffeners and both sealing flanges. The clamps each have an elongated body portion extending through the aligned openings and enlarged portions at each end for engaging the oppositely facing sides of the stiffeners. With this structure, the clamping structures can be kept within the bounds of the flanges and stiffeners.

Preferably, the aligned openings in one stiffener and the corresponding sealing flange are transversely elongated and the fastener comprises a transversely elongated enlarged end portion which fits through the enlarged opening and in between the legs of the U-shaped gasket when aligned. When not aligned, the elongated enlarged end portion of the fastener forms an interference with the stiffener. The combination of the U-shaped gasket with the aforementioned structure is particularly advantageous since it allows the transversely elongated end portion of the clamp to fall in between the U-shaped gasket, thereby keeping it aligned, ready to again be inserted through the transversely elongated opening to close and reseal the container.

Preferably, means are provided for coupling the stiffener to the corresponding sealing flange so as to permit relative surface movement therebetween due to differential expansion or contraction.

BRIEF DESCRIPTION OF THE DRAWINGS

FIG. 1 is an isometric, partly broken away view of a plastic container having a resealable closure system and embodying the present invention;

FIG. 2 is an enlarged cross-sectional view of a portion of the container and sealing closure system taken along the lines 2—2 of FIG. 1;

FIG. 3 is an enlarged sectional view, partly broken away, of the portion of the container depicted in FIG. 1 taken in the area indicated;

FIG. 4 is a cross-sectional isometric view of a portion of the container taken along the lines 4—4 of FIG. 1;

FIG. 5 is a view similar to FIG. 2 of an alternate embodiment of the invention;

FIG. 6 is an enlarged view of the broken away portion as indicated in FIG. 3;

FIGS. 7 and 8 are schematic pictorial illustrations of the forces and reaction forces in the resealable closure system;

FIGS. 9, 10, 11, 12 and 13 are Figures similar to FIG. 2 of alternate embodiments of the present invention; and FIGS. 14 and 15 are Figures similar to FIG. 2 depicting alternate resealable clamping structures.

DETAILED DESCRIPTION

Refer now to the plastic container having the resealable closure system according to the present invention as shown in FIGS. 1 through 4. Included are first and second molded, flexible plastic body portions 10 and 12 defining a container. The container has a hollow chamber therein for carrying various types of hardware. The plastic body portions 10 and 12 are actually a thin plastic shell and each body portion has at least four interconnected, thin, rectangular sides 10a and an end 10b.

A resealable closure system 14 is positioned around the periphery of the internal chamber. Included in closure system 14 is a sealing flange 16 on each side of each body portion. The sealing flanges 16 on each body portion 10 and 12 form an interconnected set of flanges encircling the chamber. The sealing flanges 16 are molded integrally with the corresponding flexible body portion. Thus, the flanges 16 are formed of the same thin, flexible plastic material as the body portions. Each of the sealing flanges 16 has a flat side 16a substantially parallel with and facing a flat side 16a on the other sealing flange. Each sealing flange 16 also has a flat side 16b oppositely facing a flat side 16b on the other.

Included in the sealing closure system 14 is a stiffener 18 for each of the sealing flanges. The stiffeners 18 are L-shaped in cross-section and encircle the enclosure in a position in opposed relation to each other on the oppositely facing sides of the corresponding sealing flanges 16. It will be noted that the stiffeners 18 are metal and extend outward to help protect the plastic flanges 16 against blows to the side.

Additionally included in the sealing closure system 14 is a plurality of releaseable clamps 20. The clamps 20 are disposed around the chamber and have first and second opposed clamping sides 20a and 20b for engaging the oppositely facing sides of the stiffeners 18. To be explained in more detail in connection with the clamps, the clamps each have a first condition forcing the sealing flanges together to a first spacing as depicted in FIG. 2 and a second condition allowing the sealing flanges to be separated.

Significantly, the resealable closure system 14 has a structure 22 in between the facing sides 16a of the sealing flanges 16, when the first condition of the clamps exist, which exerts substantially balancing reaction forces between the facing sides 16a from the chamber to the exterior of the container. This structure comprises a resilient gasket 24 which encircles the container in a rectangular shape in between the facing sides of the sealing flanges 16. The gasket 24 is structured so that when the clamps are in the first condition, the gasket is compressed in between the facing sides 16a of the seal flanges 16 and forms a gas-tight seal and even a pressure seal. The structure of this gasket will be discussed in more detail hereinafter. It will be noted that the structure 22 does not include any stops which would tend to tilt or rotate the stiffeners 18 nor the flanges 16, and as a result, substantially eliminates any side loading forces on the sides 10a due to the closure system 14.

Turning specifically to the stiffener 18, the stiffener preferably is a rigid metal material. A plan view of the stiffener 18 is rectangular in shape, completely encircling the container. Although the stiffener 18 may have other cross-sectional shapes, the L-shape is preferred, since it provides added rigidity to the stiffener, which is particularly important where the container is large with widely spaced clamps.

Turning specifically to the gasket 24, it will be seen that the gasket is generally U-shaped in cross-section. This shape of the gasket is preferred since it has been found that it provides an adequate seal with relatively low closing forces and allows for irregularities in the spacing between the sealing flanges while still providing balanced reactions. Additionally, as will be noted in subsequent discussions, it allows the clamps 20 to be held in proper orientation for reclosure after the container has been opened.

Aligned openings 26 are provided for each of the clamps 20. The openings 26 extend through the stiffeners 18 and both of the sealing flanges 16. Each of the clamps has an elongated body portion 20c extending through the aligned openings 26. The enlarged portions 20a and 20b at each end of the elongated body portion 20c engage the oppositely facing sides of the stiffeners 18.

Preferably, the aligned openings 26 in one of the stiffeners and the corresponding sealing flange are transversely elongated as depicted at 26a in FIG. 4. Also, the clamp 20 has a transversely elongated enlarged end portion 20e which fits through the elongated opening 26a when the elongated opening 26a and the elongated portion 20e are aligned. When so aligned, the elongated portion 20e of the clamp drops down through the elongated opening 26a and in between the upstanding legs of the U-shaped gasket 24. The width of the elongated portion 20e of the clamp 20 is such that it falls in between the upstanding legs of the gasket 24, thereby holding the clamp in alignment ready to be reinserted back through the elongated opening 26a when it is desired to reseal the closure. However, the elongated portion 20e has sufficient length that it forms an interference with the stiffener 18 on each side of the elongated opening 26a when rotated out of alignment.

Preferably, the interfacing sides of the stiffeners 18 and sealing flanges 16 are free to slide relative to each other. The connections between the stiffeners 18 and the sealing flanges 16 are provided by a coupling which permits the relative surface movement of the two parts due to differential expansion or contraction. Preferably, this connection is in the form of a rivet 28 which has an enlarged head on each end, one of which engages the outer side of the stiffener 18 and the other side of which engages the opposite side of the corresponding sealing flange 16. An opening 30 is provided through the stiffener 18 and flange 16 to permit the smaller diameter of the rivet to fit therethrough. The diameter of the opening 30 in the flange 16 is sufficiently large to allow the stiffener 18 and flange 16 to move relative to each other due to differential expansion or contraction. Referring to FIG. 6, preferably the diameter of the opening 30a through the flange 16 is of larger diameter than the rest of the opening 30 in the stiffener 18 for the rivet 28, allowing greater relative movement between the stiffener 18 and the sealing flange 16.

FIG. 5 shows a view corresponding to FIG. 2, wherein the elongated body portion 20c of the clamp 20 has a ring-shaped shoulder 20d which bears against the up facing side 16a of the lower flange 16 so as to limit the amount of deformation which can be imparted to the gasket 24. If too much deformation is applied to the gasket 24, its effectiveness is reduced.

The gasket 24 of FIGS. 1 through 5 is symmetrical about the U-shaped cross-section thereof, giving equal reaction forces by the gasket against the sealing flanges. However, it should be noted that the equal reaction force achieved in these figures may be achieved with a non-symmetrical cross-section gasket. FIG. 8 schematically depicts the forces and reaction forces between the gasket and sealing flanges. Note that the density of the force arrows indicated in an upward direction is uniform. Referring to FIG. 7, if a non-symmetrical gasket such as 24-1 is used where the contact surface of the gasket on one side is smaller than the contact surface on the other side, the force applied by .......... the clamp merely needs to be shifted to compensate. Under these conditions, the dimensions a and b between the position of the force F applied by the clamp are depicted so that equal reaction forces are exerted.

Although the shape of the gasket depicted in FIGS. 1 through 5 and the construction of the clamp 20 depicted is preferred, other shapes of the gasket and of the clamp may be devised within the broader scopes of the present invention. For example, in FIG. 9, the opening 44 through both the upper and lower stiffeners 18 and sealing flanges 16 may be completely round and a threaded nut 40 and bolt 42 may be employed for clamping the upper and lower stiffeners and flanges together. Additionally, the gasket 46 depicted in between the upper and lower flanges 16 may be rectangular in cross-section as depicted.

FIG. 10 is similar to FIG. 9 except that the lower portion of the container is depicted with a rigid metal flange 48. In place of the metal flange 48, the flange on the lower part of the container may be an enlarged rigid extension of the lower container part.

FIGS. 11, 12 and 13 depict alternate configurations of the stiffener, container flanges and gasket. Thus, in FIG. 11, the lower flange 16 and stiffener 18 are essentially the same as that depicted in FIGS. 1 through 5, however, the upper flange and stiffener are depicted as semi-circular in shape. Additionally, the gasket 24-1 is depicted as having semi-circular sides for conforming with the semi-circular lower side of the sealing flange 16-1. In FIG. 13 the upper and lower stiffeners 18 and flanges 16 are essentially the same as that depicted in FIGS. 1 through 5. However, a gasket 24-2 is depicted which is formed in two separate sections 24-2b and 24-2a. The sections 24-2a and 24-2b are substantially equal and square in cross-section.

FIG. 12 depicts still another configuration wherein the upper and lower stiffeners 18-2 are tubular in cross-section and the upper and lower flanges 16-2 are semi-circular in cross-section, conforming to the outside diameter of the tubes. An alternate configuration for the cross-section of the rubber gasket 24-2 is also depicted.

FIG. 14 depicts in cross-section an alternate configuration for the closure fastener. Here a slot-shaped opening 49 is provided through the upper and lower stiffeners 18 and flanges 16 through which the arm 50a of a closure fastener 50 extends. The arm 50a has a notch which fits around a metal rod 52. The metal rod 52 extends clear across the opening 49. The closure fastener 50 includes an arm 50b which, when actuated to the left, moves the arm 50a to the left and out of engagement with the rod 52. When the arm 50b is actuated to the right, the arm 50a is moved to the right until the notch engages the metal rod 52, thereby applying opposing forces to the outwardly facing sides of the stiffeners 18.

FIG. 15 depicts still another configuration for the closure fastener, the dotted outline depicting the unlocked condition.

It will be noted that the preferred embodiment of the invention is with a container that is rectangular in cross-section as depicted in FIG. 1. However, it should be noted that the present invention within its broader concepts may also be applicable to circular containers which have but a single side, spherical containers or containers having a non-plane closure system (like the seams on a baseball).

What is claimed is:

1. A plastic container having improved resealable closure system comprising:

a. first and second flexible plastic body portions together defining a chamber and each comprising at least one side encircling the chamber;
b. a resealable closure system comprising
1. a sealing flange on the at least one side of each body portion, the sealing flanges each encircling the chamber and formed from the corresponding flexible plastic body portion and comprising a side on each, facing the other and a side on each oppositely facing the other,
2. a stiffener for each of the sealing flanges, the stiffeners encircling the chamber and positioned in opposed relation to each other on the oppositely facing sides of the corresponding sealing flanges,
3. a plurality of releasable clamps disposed around the chamber and comprising first and second opposed clamping sides for engaging oppositely facing sides of the stiffeners, the clamps each having a first condition of the clamping side, forcing the stiffeners and sealing flanges together to a sealed condition and a second condition allowing the sealing flanges to separate, and
4. a structure in between the facing sides of the sealing flanges when the first condition exists which exerts substantially balancing reaction forces between the facing sides from the chamber to the exterior of the container, the structure comprising a resilient gasket encircling the chamber in between the facing sides of the seal flange, the gasket being structured for providing, around the chamber, between the facing sides of the sealing flanges, a gas-tight seal with substantially balancing reaction forces from the chamber to the outer sides of the gasket, the structure thereby substantially eliminating side loading forces on the at least one side due to closure system.

2. A container according to claim 1 wherein said stiffener is formed of a metal.

3. A container according to claim 2 wherein said stiffener has an L-shaped cross-section.

4. A container according to claim 1 wherein said at least one side comprises a plurality of interconnected substantially flat sides.

5. A container according to claim 4 wherein there are four sides.

6. A container according to claim 1 wherein said gasket has a U-shaped cross-section.

7. A container according to claim 5 wherein said resealable closure system comprises:
a. a stiffener on the oppositely facing side of each sealing flange;
b. aligned openings for each clamp through said stiffeners and both sealing flanges;
c. said clamps each comprising an elongated body portion extending through said aligned openings and enlarged portions at each end for engaging the oppositely facing sides of said stiffeners.

8. A container according to claim 7 wherein said aligned openings in one of said stiffeners and the corresponding sealing flange is transversely elongated and one of each said clamps comprises a transversely elongated enlarged end portion which fits through the elongated opening and in between the legs of the U-shaped gasket when aligned and forms an interference with the stiffener when not aligned.

9. A container according to claim 1 wherein the facing sides of the stiffener and sealing flanges are free to slide relative to each other.

10. A container according to claim 1 comprising means for coupling the stiffener to the corresponding sealing flange to permit relative surface movement therebetween due to differential expansion or contraction.

11. A container according to claim 10 wherein said coupling means comprises at least one set of aligned openings in said stiffener and corresponding sealing flange and a fastener extending therethrough having an enlarged opposite ends engaging the oppositely facing sides of said stiffener and corresponding sealing flange, at least one of said openings being larger than the outer perimeter of the fastener extending therethrough.

12. A container according to claim 1 wherein said resealable closure system comprises:
a. a stiffener on the oppositely facing side of each sealing flange;
b. aligned openings for each clamp through said stiffeners and both sealing flanges;
c. each said clamp comprising an elongated body portion extending through said aligned openings and enlarged portions at each end for engaging the oppositely facing sides of said stiffeners.

13. A container according to claim 11 wherein said aligned openings in one of said stiffeners and the corresponding sealing flange are transversely elongated and one of each said clamp comprises a transversely elongated enlarged end portion which fits into the elongated opening when aligned and forms an interference with the stiffener when not aligned.

14. A plastic container having improved resealable closure system comprising:
a. first and second flexible plastic body portions together defining a container chamber and each comprising at least one side encircling the chamber;
b. a resealable closure system comprising
1. a sealing flange on the at least one side of each body portion, the sealing flanges each encircling the chamber and formed from the corresponding flexible plastic body portion and comprising a side on each facing the other, and a side on each oppositely facing the other,
2. a stiffener for at least one of the sealing flanges, the stiffener encircling the chamber and positioned on the oppositely facing side of the corresponding sealing flange,
3. a plurality of releasable clamps disposed around the chamber for forcing the sealing flanges toward each other, the clamps acting through the stiffener on the corresponding sealing flange, the clamps each having a first condition forcing the sealing flanges together to a sealed condition and a second condition allowing the sealing flanges to separate, and
4. a structure in between the facing sides of the sealing flanges when the first condition exists which exerts substantially balancing reaction forces between the facing sides from the chamber to the exterior of the container, the structure comprising a resilient gasket encircling the chamber in between the facing sides of the sealing flanges, the gasket being structured for providing, between the facing sides of the sealing flanges and the gasket a gas-tight seal with substantially balancing reaction forces from the chamber to the outer sides of the gasket, the structure thereby substantially eliminating side loading forces on the at least one side due to closure system.

15. A container according to claim 14 wherein the sealing flange which is not recited as having a stiffener is rigid, thereby avoiding the need for a stiffener.

16. A plastic container having improved resealable closure system comprising:
   a. first and second flexible plastic body portions together defining a container, having a chamber therein, each body portion comprising at least four interconnected rectangular sides encircling the chamber and an end;
   b. a resealable closure system comprising
      1. a sealing flange on each side of each body portion, the sealing flanges on each body portion encircling the chamber and formed from the corresponding flexible plastic body portion, each set of sealing flanges comprising a flat side, substantially parallel with and facing a flat side on the other set and a flat side on each set oppositely facing a flat side on the other set,
      2. a metal stiffener for each of the sealing flanges, the stiffeners encircling the chamber and positioned in opposed relation to each other on the oppositely facing sides of the corresponding sealing flanges,
      3. a plurality of releasable clamps disposed around the chamber and comprising first and second opposed clamping sides for engaging oppositely facing sides of the stiffeners, the clamps each having a first condition, forcing the sealing flanges to a sealed condition and a second condition allowing the sealing flanges to be separated, and
      4. a structure in between the facing sides of the sealing flanges allowing the sealing flanges to be moved, with a fixed relative angular orientation, from the second to first spaced condition, the structure comprising a resilient gasket encircling the chamber in between the facing sides of the sealing flange, the gasket being structured for providing, around the chamber, between the facing sides of the sealing flanges a gas-tight seal with substantially equal reaction forces from the chamber to the outer sides of the gasket, the structure thereby substantially eliminating side loading forces on the at least four sides due to closure system.

* * * * *

UNITED STATES PATENT OFFICE
CERTIFICATE OF CORRECTION

Patent No. 3,858,752          Dated January 7, 1975

Inventor(s) Richard T. Marvin, Jr.

It is certified that error appears in the above-identified patent and that said Letters Patent are hereby corrected as shown below:

Col. 8, line 12, delete "an";

Col. 8, line 30, delete "one of"; change "clamp" to -- clamps --

Signed and Sealed this twenty-seventh Day of January 1976

[SEAL]

Attest:

RUTH C. MASON
Attesting Officer

C. MARSHALL DANN
Commissioner of Patents and Trademarks